Figure 1:
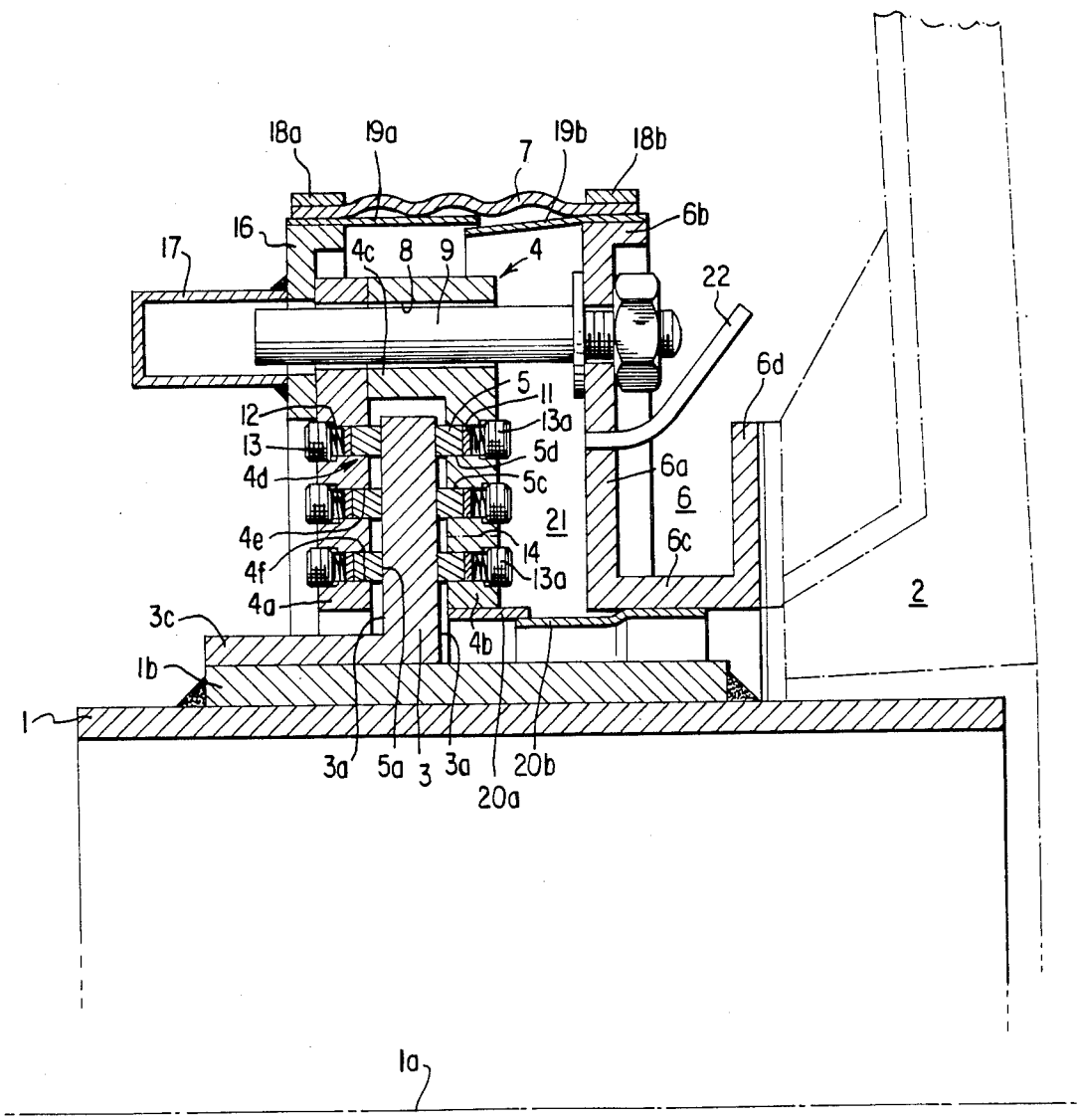

United States Patent [19]

Stalter et al.

[11] Patent Number: 4,813,689

[45] Date of Patent: Mar. 21, 1989

[54] DUAL FACE SEAL WITH RADIALLY PROJECTING ANNULAR DISC

[75] Inventors: Winfried Stalter, Bergkirchen; Manfred Rehmann, Geretsried, both of Fed. Rep. of Germany

[73] Assignee: Feodor Burgmann Dichtungswerke GmbH & Co., Wolfratshausen, Fed. Rep. of Germany

[21] Appl. No.: 137,152

[22] Filed: Dec. 23, 1987

[30] Foreign Application Priority Data

Dec. 23, 1986 [DE] Fed. Rep. of Germany ....... 3644330

[51] Int. Cl.⁴ .............................................. F16J 15/38
[52] U.S. Cl. .................................. 277/65; 277/81 R; 277/82; 277/88; 277/95
[58] Field of Search ................... 277/65, 81 R, 82, 85, 277/88, 91, 93 SD, 95

[56] References Cited

U.S. PATENT DOCUMENTS

| | | |
|---|---|---|
| 926,414 | 6/1909 | Hendrickson ........................ 277/65 |
| 2,265,953 | 12/1941 | Mortensen et al. . |
| 2,281,157 | 4/1942 | Kanuch et al. . |
| 2,509,912 | 5/1950 | Eliasson . |
| 2,672,357 | 3/1954 | Voytech . |
| 2,738,208 | 3/1956 | Mylander .......................... 277/65 X |
| 3,260,530 | 7/1966 | Jelatis et al. ...................... 277/65 X |
| 4,071,253 | 1/1978 | Heinen et al. ..................... 277/65 X |
| 4,361,333 | 11/1982 | Firth ............................... 277/81 R X |
| 4,406,464 | 9/1983 | Schymura ....................... 277/81 R X |

FOREIGN PATENT DOCUMENTS 3320767 12/1984 Fed. Rep. of Germany .
2501844 9/1982 France .

Primary Examiner—Robert S. Ward
Attorney, Agent, or Firm—Spencer & Frank

[57] ABSTRACT

A seal between a first component (1') formed by the stationary component (2'). The first component is provided with a radially outwardly projecting annular disc (3') which grips around a ring housing (4') having a U-shaped cross section and being sealed against the second component by a compensator (7'). The inner faces of the two side walls (4'a, 4'b) of the housing are provided with concentrically arranged annular grooves (4d). A sealing ring (5) of an elastically yielding sealing material and an elastically bendable supporting ring (11) are arranged in the annular grooves so as to be axially displaceable. One side of the supporting ring lies against the sealing ring (5) while its other side is supported on springs (12) which press the sealing ring against the annular disc. The ring housing (4') is supported by hanging means (27) from a stationary supporting frame, is axially guided at the annular disc by guide rollers (23) and is secured against twisting by track rollers (24) which cooperate with bolts (9) that are fixed to the second component (2') and are parallel to the axis of rotation (1a). The seal prevents leakage if the two components (1'; 2') are subjected to great axial, radial and angular displacements and the annular disc (3') is deformed.

16 Claims, 2 Drawing Sheets

DUAL FACE SEAL WITH RADIALLY PROJECTING ANNULAR DISC

The invention relates to a seal between a first component and a second component, with the components performing a rotary or pivotal movement relative to one another about an axis of rotation. The seal includes a radially outwardly projecting annular disc disposed at the first component in a sealing manner, axially undisplaceable and fixed against rotation. On each one of its axial frontal faces, the sealing disc is provided with an annular slide path disposed in a plane perpendicular to the axis of rotation. The seal further includes an annular, radially inwardly open housing held at the second component in a sealing manner, axially displaceable and secure against rotation. This housing has a central section which grips with play around the outer circumferential face of the annular disk and with its two side walls projecting radially inwardly from the central section it grips, likewise with play, around the slide paths of the annular disc. There are also provided at least two sealing rings which are coaxial with the axis of rotation, with their slide faces lying against the slide paths. These sealing rings are sealingly held at the housing in a manner secured against rotation. There also are a plurality of springs which are associated with at least one sealing ring and are clamped in between the bottom face facing away from the slide face of the sealing ring and the housing to press the sealing rings against the slide paths.

In a known such axial slide ring seal (U.S. Pat. No. 2,672,357), the first component is composed of a shaft and the second component of a terminating plate which is part, for example, of a pump housing and from which projects a piece of pipe which surrounds the shaft with a slight amount of play. The housing of this seal has an elongate, tubular central section and a cylindrical inner circumferential face, a first annular side wall which surrounds the piece of pipe with a slight amount of radial play and is held at the terminating plate in a manner secure against rotation by means of a tongue and groove connection and a second annular side wall which, at its radially inner end, continues as a tubular projection extending into the interior of the housing, with the outer circumferential face of this projection being cylindrical. The slide faces of a sealing ring—configured as a solid slide ring in each case—lie against each one of the two slide paths of the annular disc.

The outer circumference of the first one of these slide rings is supported on the inner circumferential face of the central section and is secured against rotation by a pin and groove connection. Its bottom face facing away from the slide face is supported, by way of a secondary seal without spring action, against the first side wall of the housing. The inner circumference of the first slide ring is sealed against the piece of pipe by means of an O-ring serving as the radial bearing element for the entire seal.

The second slide ring is supported by means of a plurality of springs against the inner face of the second side wall and is configured as an annular piston which is mounted in an annular cylinder so as to form a seal and be displaceable. This annular cylinder is formed by part of the central section, the second side wall and its tubular extension. This piston/cylinder arrangement is subjected to the pressure of a fluid which supports the pressure exertion of the springs.

Although the prior art seal is able, to a certain extent, to absorb relative axial, radial and also angular displacements of the shaft with respect to the terminating plate, i.e. between the first component and the second component, while maintaining the sealing effect, it cannot be used in cases in which, in addition to high temperatures, large displacements occur in all mentioned categories or in which the annular disc provided with the slide paths and being part of the seal is deformed. Such cases exist, for example, if the first component is formed by the revolving pipe of a rotary kiln furnace and the second component is its burner head.

It is an object of the invention to provide a seal which can be used at high temperatures and permits a reliable seal between two components even if these components have large dimensions and are subjected during operation to great and alternating axial, radial and angular displacements between the components and/or if the slide paths are no longer completely planar due to undulations in the annular disc.

This is accomplished by the invention in that the housing has an essentially U-shaped configuration and is composed of two housing parts which each include one of the side walls and which are connected together in the region of the central section so as to be immovable and form a seal. The housing is sealed against the second component by means of a compensator. At least two mutually concentric annular grooves are formed in the inner face of each side wall, which is essentially parallel to the annular disc, with these annular grooves being coaxial with the axis of rotation and each supporting a sealing ring. Each groove has essentially cylindrical radially outer and inner delimiting faces and has a depth which is greater than the axial length of the sealing ring. The sealing rings are made of an elastically yielding sealing material. A first part of the axial length of each ring projects beyond the inner face of the side wall and a second part of their axial length is mounted in the annular groove so as to be displaceable in the direction of the axis of rotation and lie sealingly against the radially outer and inner delimiting faces of the annular groove. An elastically bendable supporting ring is disposed in each annular groove with play relative to the radially inner and outer delimiting faces. The one side of the supporting ring lies against the bottom face of the sealing ring an its other side is supported on the springs.

With this configuration, the seal housing is able to follow the axial and angular displacements of the annular disc practically unimpededly and limited only by the configuration of the torque transmission from the second component to the housing, thus essentially relieving the sealing rings of any guidance functions. Due to the elastically yielding configuration of the sealing rings in conjunction with the elastically bendable supporting rings, the sealing faces of the sealing rings are able to adapt themselves to undulating warping of the slide paths so that, in conjunction with the multiple arrangement of sealing rings, a reliable seal is realized for the two components under all operating conditions.

Figure 2:
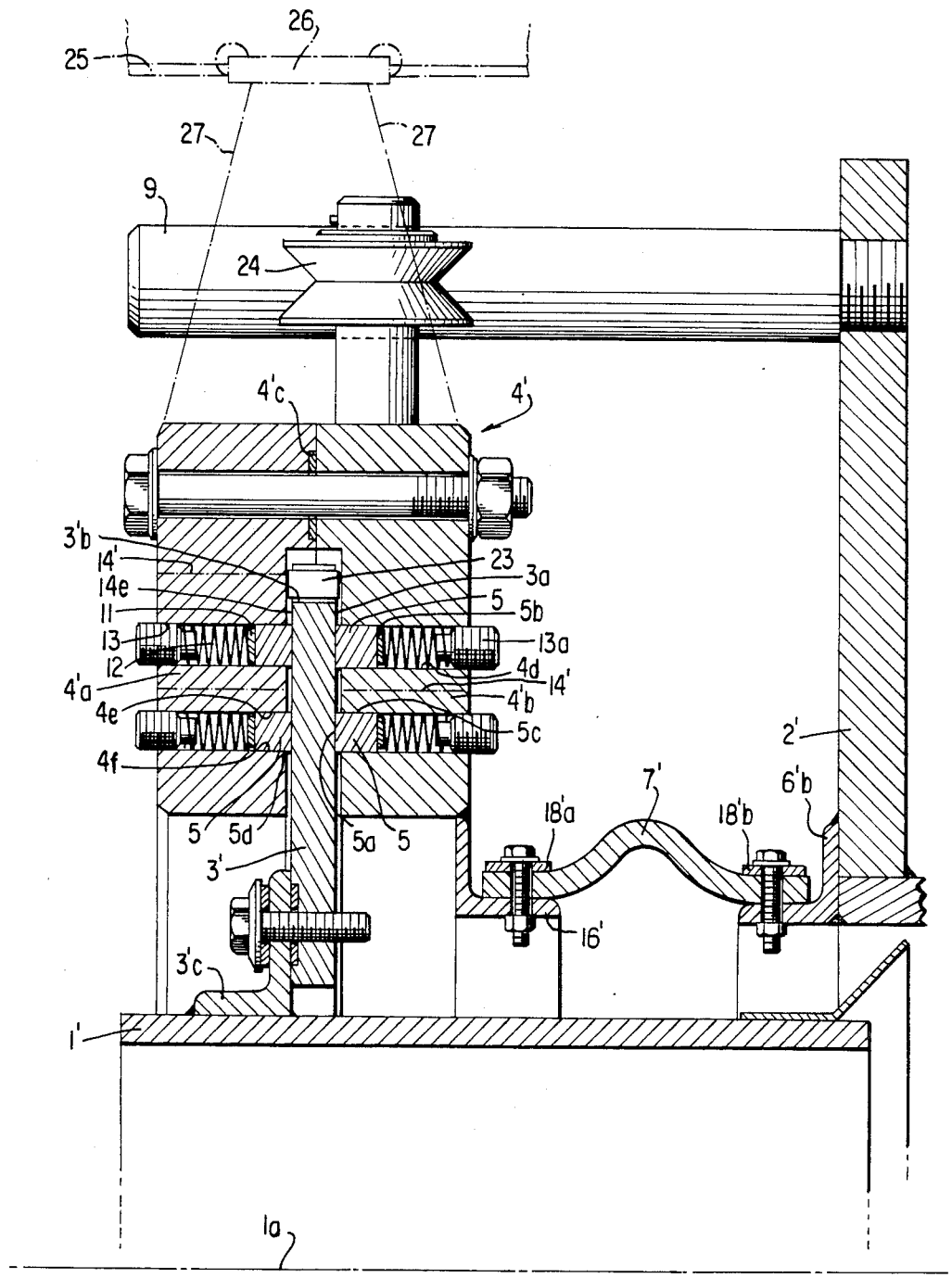

Further features and advantages of the invention will become evident from the dependent claims and the description below of embodiments of the invention with reference to the drawing figures which depict the following:

FIG. 1, a longitudinal sectional view of the upper part of a first embodiment of the seal; and FIG. 2, a longitudinal sectional view of the upper part of a second embodiment of the seal.

The seal shown in FIG. 1 (and also that shown in FIG. 2) is intended to seal a first component 1 which is formed by the revolving pipe of a rotary kiln furnace and revolves around its axis of rotation (longitudinal axis) 1a against a stationary second component formed by a burner head.

The seal is essentially composed of an annular disc 3 fastened to the first component 1, a housing 4 which supports a total of six sealing rings 5 cooperating with the annular disc, an intermediate carrier 6 fastened immovably to the second component 2, a compensator 7 which seals the housing 4 against the intermediate carrier, and a guide with which the housing is held secure against rotation but displaceable in the direction of the axis of rotation 1a at the intermediate carrier and which is formed by a plurality of guide bores 8 in the housing. Bolts 9, which are fixed to intermediate carrier 6 and thus to second component 2 and whose axes extend parallel to axis of rotation 1a, engage in these guide bores.

On both its axial frontal faces, in planes perpendicular to axis of rotation 1a, annular disc 3 is provided with slide paths 3a intended for sealing rings 5. Radially inwardly, annular disc 3 is continued in the form of a pipe section 3c which is fastened by means of screws (not shown) to the outer circumference of a reinforcing tie 1b which, in turn, is fastened by welding to the outer circumference of the first component 1. To facilitate installation, annular disc 3 is divided by stepped, molded dividing grooves which lie, at least approximately, in planes including axis of rotation 1a and is not assembled into a unit by means of screws (not shown) until it is at the installation location.

Housing 4 is configured as a ring having a U-shaped cross section and encloses annular disc 3 with play. The housing is composed of two side walls 4a, 4b which emanate from a central section 4c. Each side wall 4a, 4b has in its interior face three annular grooves 4d which are arranged concentrically to axis of rotation 1a and are open in the direction of axis of rotation 1a, i.e. toward slide paths 3a of the annular disc. Bores 13 extend from the bottom of annular grooves 4d toward the outer faces of the side walls. These bores are provided with internal threads on sections adjacent to these outer faces. The housing is divided along a first dividing groove which lies in a plane perpendicular to axis of rotation 1a and is brought through the central section 4a and also along second dividing grooves (not visible in the drawing) which lie in planes containing axis of rotation 1a. To facilitate installation, at least the housing parts formed by the second dividing groove are not connected together in a sealing manner by screwing or welding until they are at the installation location.

Sealing rings 5 have a rectangular cross section and are composed of an elastically yielding sealing material, preferably shaped, endless, closed strands of fiber-like sealing material. Each sealing ring 5 is inserted into an annular groove 4d in such a manner that part of its axial length projects beyond the inner face of side wall 4a, 4b and its slide face 5a lies against slide path 3a of annular disc 3. The other part of each sealing ring lies with its radially outer and radially inner circumferential faces 5c, 5d sealingly against the radially outer and radially inner delimiting faces 4e, 4f, respectively, but displaceably in the direction of axis of rotation 1a.

Before installation of sealing rings 5, a supporting ring 11 is inserted into each annular groove 4d with at least a slight amount of play relative to the radially outer and inner delimiting faces 4e, 4f. Supporting ring 11 is designed, by selection of its material and by its cross-sectional configuration, so that it is able to elastically adapt itself to the elongate warping of the annular disc (i.e. warping undulations having a greater wavelength than the distance between two springs 12), but, on the other hand, is stiff enough that, under consideration of the elasticity of sealing ring 5, its slide face 5a is also pressed against slide path 3a, at a location disposed in the center between two springs, with a surface pressure of at least 0.1 N/mm.

Bores 13 emanating from the bottom of annular grooves 4d each receive a spring 12 configured as a coil spring with these springs being supported, on the one hand, by supporting ring 11 and, on the other hand, by pressure screws 13a. The springs impart an initial tension to sealing rings 5 in the direction toward the slide paths 3a of annular disc 3. The compressive force can be set by the depth to which screws 13a are screwed in.

An intake bore 14 is provided at least between two annular grooves 4d in a side wall 4a, 4b which are adjacent one another with respect to the leakage direction, with a lubricant or blocking medium being introduced through these bores into the annular chamber defined between these two sealing rings.

In its central section 4c, housing 4 is penetrated by a plurality of guide bores 8 which are uniformly distributed about the circumference. By means of screws (not shown), an annular body 16 in the form of an angle ring is fastened to side wall 4a. The radially outer cylindrical circumferential face of this annular body has a larger diameter than housing 4. In the region of guide bores 8, annular body 16 is provided with apertures which permit the passage of bolt 9 and are closed off by means of welded-on cylindrical caps 17.

The intermediate carrier 6 fastened to second component 2 includes an annular disc shaped web 6a facing housing 4 and continued at its radially outer and inner edges in annular projections 6b and 6c, respectively, which project oppositely to housing 4. The last-mentioned projection is, in turn, continued in a further annular disc shaped web 6d which is fastened by means of screws (not shown) and through the intermediary of a sealing disc to second component 2. Web 6a is provided with bores which are flush with guide bores 8 and in which the ends of bolts 9 are inserted with their threaded ends and are fastened by means of collars fixed to the bolt and by nuts. The other, cylindrical ends of bolts 9 extend into guide bores 8, thus enabling housing 4 to perform a displacement movement in the direction of axis of rotation 1a with respect to intermediate carrier 6 and thus with respect to the second component 2, but preventing it from rotating.

Compensator 7 is held by means of ties 18a, 18b on the outer cylindrical circumferential faces of, on the one hand, annular body 16 and, on the other hand, projection 6b. Disposed directly below compensator 7 and clamped in together with it is a first auxiliary seal composed of two thin-walled pipe sections 19a, 19b which have almost the same diameters and whose free ends facing away from the clamping locations overlap one another. A second auxiliary seal of basically the same construction including pipe sections 20a, 20b is fastened to the radially inwardly disposed circumference of side wall 4b and to the annular projection 6c of intermediate carrier 6, respectively. The overlapping ends of the auxiliary seals may lie slidingly on top of one another or may form a gap of minimum size between them. The two auxiliary seals enclose an annular chamber 21 which can be charged through a conduit 22 with a blocking medium which preferably is under a slightly higher pressure than the medium which the seal is intended to seal off.

In FIG. 2, which illustrates a second embodiment of the invention, components of the same configuration as in the first embodiment or performing the same function are given the same reference numerals (possibly supplemented by a prime symbol). The description above should be utilized for their explanation.

Annular disc 3' is fastened by means of screws and through the intermediary of a sealing ring to an angle ring 3'c which, in turn, is welded to a first component 1'. A plurality of guide rollers 23 are arranged at uniform spacing around the outer circumferential face 3'b of the annular disc, with the axes of rotation of these guide rollers going through axis of rotation 1a of first component 1' and being perpendicular to the latter axis of rotation. The guide rollers have a diameter which is larger than the axial thickness of annular disc 3' but somewhat smaller than the spacing between the inner faces of side walls 3'a, 3'b. Guide rollers 23 cause housing 4' to follow axial and angular movements of annular disc 3' so that sealing rings 5 are prevented from absorbing such guide forces and are only required to compensate, by way of axial movement within their annular grooves 4d, minor undulations of the annular disc or to readjust themselves due to wear. The play between guide rollers 23 and the inner faces of the side walls ensures that annular disc 3' will not jam in housing 4' if the disc warps during operation, i.e. becomes uneven.

An annular body 16' configured as an angle ring is welded to the side wall 4'b adjacent the second component 2' at the radially inward circumference of that wall. A projection 6'b formed likewise by an angle ring is welded to the second component 2'. The two ends of compensator 7' are fastened by means of ties 18'a, 18'b and screws to the outer circumferential faces of annular body 16' and projection 6'b which have the same diameters. Due to this configuration, all screws 13a are accessible for adjusting the contact pressure of springs 12 even during operation without removal of compensator 7'.

Two bolts 9 project from the stationarily configure second component 2' beyond the outer circumference of central section 4'c. At the frontal face of each bolt 9, with respect to the direction of rotation of first component 1', there lies a track roller 24 which is mounted so as to rotate on a pin fastened to housing 4' and be displaceable by a small amount in the axial direction of the pin. The axes of the pins lie in a common plane perpendicularly penetrated by axis of rotation 1a. Additionally, each axis lies in a plane parallel to axis of rotation 1a which is preferably spaced from the axis of rotation at a distance corresponding approximately to one-half the diameter of the track roller (i.e. the track rollers shown in FIG. 2 and their pins are disposed above the plane of the drawing).

Above housing 4', there is provided a supporting frame 25 which is stationary, i.e. fixed to second component 2', and has a guide parallel to axis of rotation 1a on which a carriage 26 can be displaced, with housing 4' being suspended therefrom by hanging means 27. By the described arrangement and configuration of elements 9 and 24 to 27, housing 4' is prevented from rotating with respect to second component 2' but is able, practically without interference, to follow axial and tumbling movements of annular disc 3'.

We claim:

1. A seal between a first component (1; 1') and a second component (2; 2') performing rotary or pivotal movements relative to one another about an axis of rotation (1a), the seal comprising a radially outwardly projecting annular disc (3; 3') disposed at the first component (1; 1') in a sealing manner, axially undisplaceable and fixed against rotation and provided, on each one of its axial frontal faces, with an annular slide path (3a) disposed in a plane perpendicular to the axis of rotation (1a);

an annular, radially inwardly open housing (4; 4') held at the first component (1; 1') in a sealing manner, axially displaceable and secure against rotation, said housing having a central section (4c; 4'c) which grips with play around the outer circumferential face (3b) of the annular disc (3; 3') while its two side walls (4a, 4b; 4'a, 4'b) project radially inwardly from the central section and grip, likewise with play, around the slide paths (3a) of the annular disc;

at least two sealing rings (5) which are coaxial with the axis of rotation (1a), with their slide faces (5a) lying against the slide paths (3a) and being sealingly held at the housing (4; 4a) in a manner secured against rotation; and a plurality of springs (12) which are associated with at least one sealing ring and are clamped in between the bottom face (5b) facing away from the slide face (5a) of the sealing ring (5) and the housing (4; 4') to press the sealing rings against the slide paths (3a), characterized in that the housing (4; 4') has an essentially U-shaped configuration and is composed of two housing parts, each including one of the side walls (4a, 4b; 4'a, 4'b) and being immovably and sealingly connected with one another in the region of the central section (4c, 4'c);

the housing (4; 4') is sealed against the second component (2; 2') by a compensator (7; 7');

at least two annular grooves (4d) which are concentric with one another and coaxial with the axis of rotation (1a) are formed in the inner face of each side wall (4a, 4b; 4'a, 4'b) which is essentially parallel to the annular disc (3a; 3'a), each of said annular grooves supporting a sealing ring (5) and having essentially cylindrically shaped radially outer and inner delimiting faces (4e, 4f) and a depth which is greater than the axial length of the sealing ring;

the sealing rings (5) are made of an elastically yielding sealing material, each project with a first part of their axial length beyond the inner face of the side wall (4a, 4b; 4'a, 4'b) while a second part of their axial length is mounted in the annular groove (4d) so as to be displaceable in the direction of the axis of rotation (1a) and to lie sealingly against the radially outer and inner delimiting faces (4e, 4f) of the annular groove; and an elastically bendable supporting ring (11) is disposed with play relative to the radially inner and outer delimiting faces (4e, 4f) in each annular groove (4d), with the one side of said supporting ring lying against the bottom face (5b) of the sealing ring and the other side of said ring being supported at the springs (12).

2. A seal according to claim 1, characterized in that the springs (12) are coil springs and are disposed in bores (13); said bores are equidistantly spaced from one another and extend from the bottom of the annular groove (4d) to the exterior of the side wall (4a) of the housing (4; 4'); and at least the length sections of said bores adjacent the exterior are provided with internal threads to receive pressure screws (13), with the pressure forces exerted by the springs (12) being adjustable by way of their screw-in depth.

3. A seal according to claim 1, characterized in that the sealing rings (5) are formed of shaped strands of a fiber-like sealing material and have an essentially rectangular cross-sectional configuration.

4. A seal according to claim 1, characterized in that the supporting ring (11) is configured, with respect to its cross-sectional configuration and the modulus of elasticity of its material, so that, with given values for the elasticity of the material of the sealing ring (5) as well as for its axial length and for the spacing as well as the pressure force of the spring (12), the surface pressure never falls below a value of $0.1 \text{ N/mm}^2$ at any point on the slide face (5a).

5. A seal according to claim 1, characterized in that, in the vicinity of the outer circumferential face (3b) of the annular disc (3') there are disposed a plurality of guide rollers (23) at mutually equal distances, with the roll axis of said rollers being perpendicular to the axis of rotation (1a) in the axial center between the slide paths (3a) and the diameter of said guide rollers is smaller by a slight amount than the distance between the inner faces of the side wall (4'a) of the housing (4').

6. A seal according to claim 1, characterized in that the housing (4; 4'), the annular disc (3; 3') and the supporting ring (11) are divided in their circumferential directions and ar combined into complete bodies by welding or screwing at the installation location.

7. A seal according to claim 1, characterized in that at least one bolt (9) having a guide face which is parallel to the axis of rotation (1a) is fastened to the second component (2; 2') and a guide member carried by the housing (4; 4') is displaceable on said guide face.

8. A seal according to claim 7, characterized in that the guide member is formed by a guide bore (8) which penetrates the central section (4c) connecting the side walls (4a, 4b) of the housing (4) and surrounds with a slight amount of radial play the guide face of the bolt (9) in the form of a cylindrical slide face while, at its exit end adjacent the free end of the bolt, the guide bore is covered by a cylindrical cap (17).

9. A seal according to claim 7, characterized in that the guide member is formed by a track roller (24) having an axis which is fixed to the housing (4').

10. A seal according to claim 1, characterized in that the second component (2') is stationary; above the housing (4'), there is disposed a stationary supporting frame (25) on which a carriage (26) is displaceable parallel to the axis of rotation (1a) and the housing is supported by the carriage by way of hanging means (27).

11. A seal according to claim 1, characterized in that the compensator (7) has a larger diameter than the housing (4), its one end is fastened to a circumferential face of an annular body (16) which radially projects beyond the housing and is sealingly fastened thereto while its other end is fastened to an annular projection (6b) of the second component.

12. A seal according to claim 1, characterized in that an annular body (16') is sealingly fastened to the housing (4') and has a circumferential face whose diameter is smaller than the diameter of the annular groove (4d) having the smallest diameter and the compensator (7') is fastened with its one end to said circumferential face and with its other end to an annular projection (6'b) of the second component (2').

13. A seal according to claim 1, characterized in that it includes an auxiliary seal which is disposed within the compensator (7) and immediately adjacent thereto and which is composed of two thin-walled pipe sections (19a, 19b) having almost the same diameter; one the end of the first pipe section (19a) is fastened to an annular body (16) which is sealingly fastened to the housing (4), while one end of the second pipe section (19b) is fastened to an intermediate carrier (6c) which is sealingly fastened to the second component (2), with the other ends of said pipe sections overlapping.

14. A seal according to claim 1, characterized in that it includes an auxiliary seal composed of two thin-walled pipe sections (20a, 20b) having almost the same diameter, with the one end of the first section (20a) being fastened to the side wall (4b) closest to the second component (2) while one end of the second pipe section (20b) is fastened to the intermediate carrier (6c) which is sealingly fastened to the second component, with the other ends of said pipe sections overlapping.

15. A seal according to claim 14, characterized in that a conduit (22) for the introduction of a blocking medium opens into the annular chamber (21) delimited by the two auxiliary seals (19a, 19b; 20a, 20b).

16. A seal according to claim 1, characterized in that at least one intake bore (14, 14') is brought through the housing (4; 4') with each intake bore opening into an annular chamber delimited by two successive sealing rings (5), when seen in the leakage direction of the medium to be sealed off.

* * * * *